Feb. 18, 1941.  R. F. ANDERSON  2,232,196
STICK HOLDER
Filed May 20, 1940  2 Sheets-Sheet 1
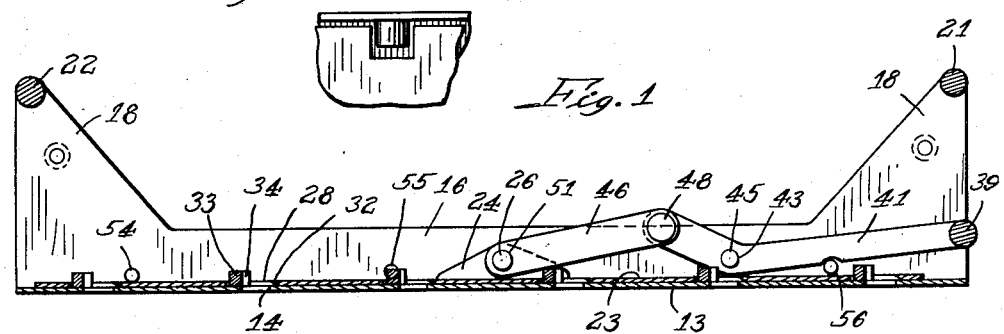
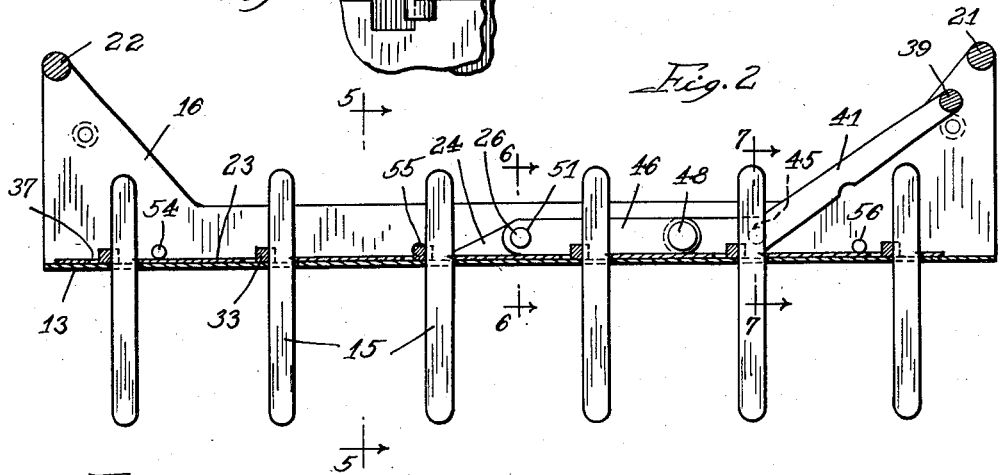
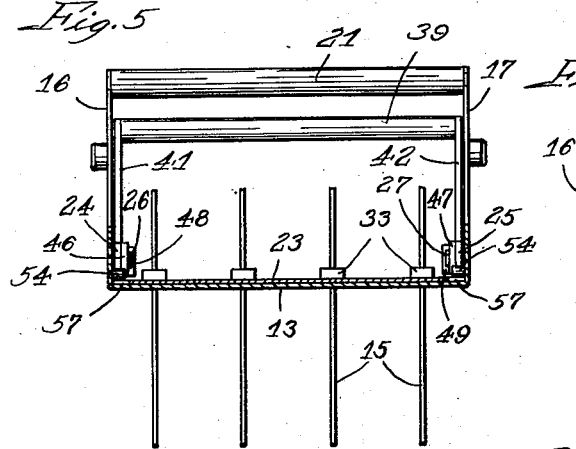
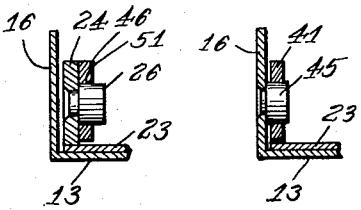
Inventor:
Ralph F. Anderson
By
McCanna, Wintercorn & Morsbach
Attys.

Feb. 18, 1941.   R. F. ANDERSON   2,232,196
STICK HOLDER
Filed May 20, 1940   2 Sheets-Sheet 2
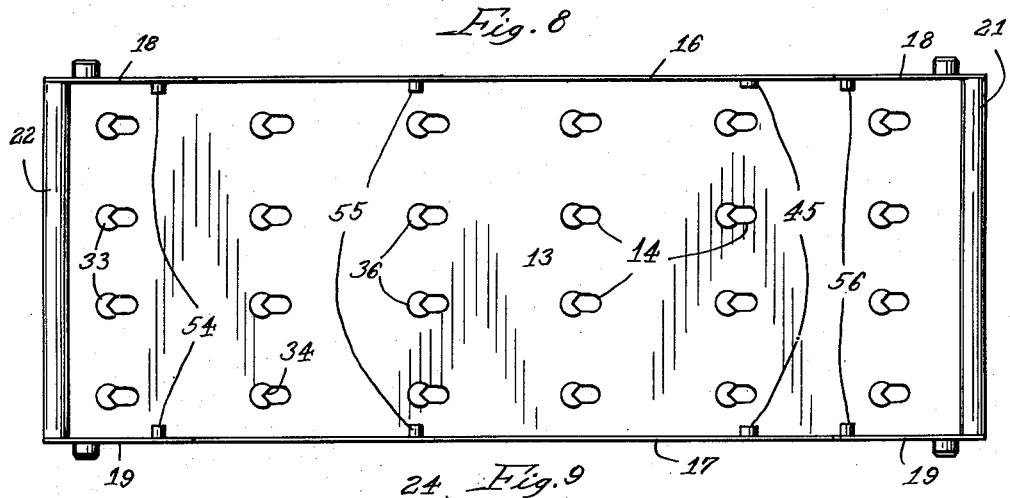
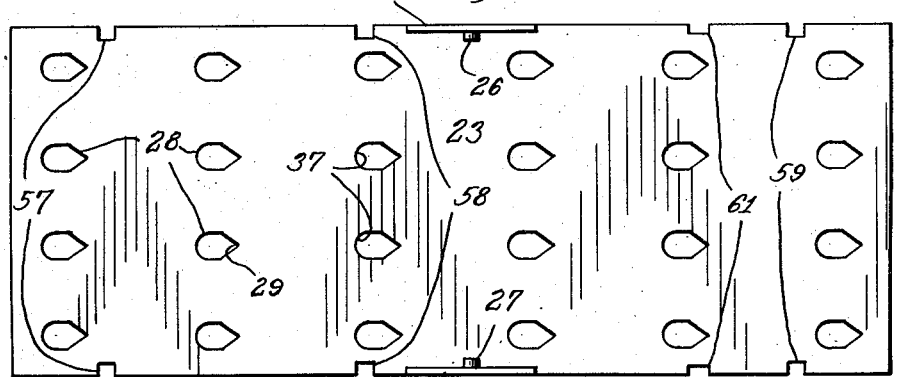
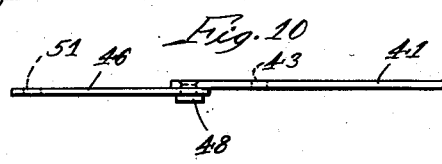
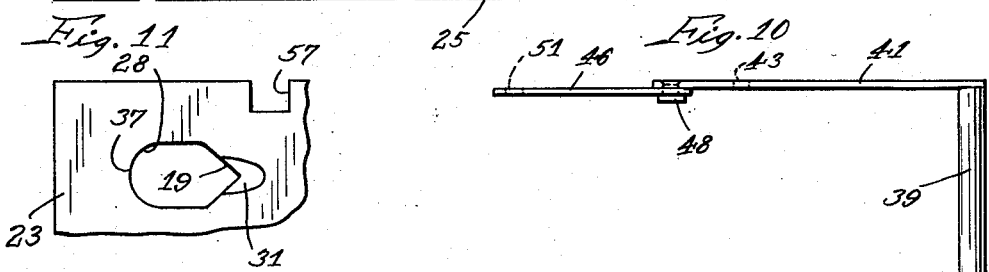
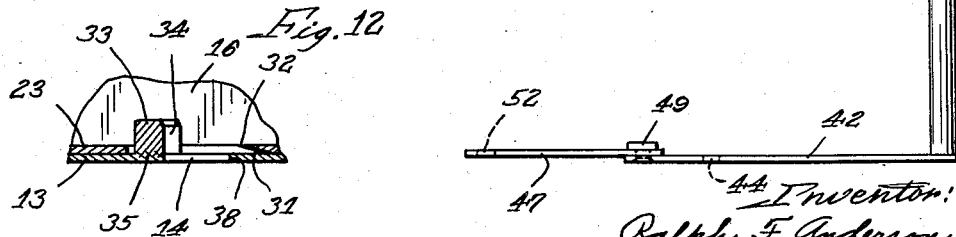
Inventor:
Ralph F. Anderson
By McCanna, Wintercorn & Morsbach
Attys.

Patented Feb. 18, 1941

2,232,196

UNITED STATES PATENT OFFICE 2,232,196

STICK HOLDER

Ralph F. Anderson, Rockford, Ill.

Application May 20, 1940, Serial No. 336,183

6 Claims. (Cl. 294—87)

This invention relates to stick holders of the type commonly used for holding a plurality of sticks in registration with molds or the like in the manufacture of stick confections such as ice cream and candy.

While devices of this general class are in common use, the requirements for such devices are constantly becoming more stringent, particularly as to the sanitation characteristics thereof, and the ease and convenience of operation. One of the serious difficulties with devices of this character is the presence of structural elements making it difficult or impossible to thoroughly clean and sterilize the holder, which cleaning is essential for proper sanitation in view of the fact that the devices are used with ice cream and the like, which present excellent culture medium for the development of bacterial growth. Another difficulty with prior art devices has been one of damage to the stick-holding mechanism occasioned by the fact that a considerable number of these holders are used in a plant, and the operators tend to pile one on top of the other and to otherwise treat the holders rather roughly. In the prior art devices this has frequently damaged the holding mechanism so that the sticks are not properly held, or so that repair is necessitated.

An important object of the invention is the provision of a stick holder of simplified design, and so constructed that all of the parts may be thoroughly cleaned and sterilized with a minimum of effort.

A further object of the invention is the provision of a stick holder construction which is free of small and intricate parts, which presents essentially large plane surfaces and which is quickly and easily disassembled for cleaning purposes.

A further object of the invention is the provision of a stick holder having novel means for holding the sticks in position, for locating the sticks, and for defining the movement of the clamping means.

I have also aimed to provide a stick holder having novel means for actuating the stick gripping members.

I have also aimed to provide a novel stick holder construction consisting essentially of two solid metal plates seated in face to face contact and arranged at their edges to guide the relative movement therebetween.

A further object of the invention is the provision of a stick holder so arranged that the sticks are automatically released in response to released movement of the stick gripping means.

Other objects and advantages will appear from the following description and the accompanying drawings, in which—

Figure 1 is a longitudinal section through a stick holder embodying my invention, the parts being shown in stick releasing position;

Fig. 2 is a section similar to Figure 1 showing the parts in stick gripping position;

Figs. 3 and 4 are fragmentary top views corresponding to Figs. 1 and 2 showing the corresponding positions of the top plate retaining means;

Fig. 5 is a transverse section taken on the line 5—5 of Fig. 2;

Fig. 6 is a section on the line 6—6 of Fig. 2 showing the connection between the link of the operating lever and the top plate;

Fig. 7 is a section on the line 7—7 of Fig. 2 showing the mounting of the operating lever;

Fig. 8 is a top view of the bottom plate with the top plate and operating levers removed;

Fig. 9 is a top view of the top plate;

Fig. 10 is a top view of the operating levers;

Fig. 11 is an enlarged view of one corner of the top plate showing the retaining slot in the edge thereof and one of the stick openings, and Fig. 12 is a vertical section through the plates in operative position showing the stick aligning means and the stick openings.

The stick holder as herein illustrated comprises a bottom plate shown in Fig. 8, a top plate shown in Fig. 9 adapted to seat upon the bottom plate and in face contact therewith, and an operating lever mechanism as shown in Fig. 10. The base plate includes a piece of sheet metal preferably of stainless steel, Monel metal, or other stainless metal formed to provide a bottom surface designated generally by the numeral 13 having a plane upper surface, the bottom surface 13 having a plurality of openings designated generally by the numeral 14 spaced in transverse and longitudinal rows for the reception of the conventional confection sticks as shown at 15 (Fig. 2). The side edges of the plate are formed upwardly to provide upstanding flanges 16 and 17 extending along opposite sides of the plate, these flanges terminating adjacent their ends in upwardly disposed arms 18 and 19 which are interconnected by handles 21 and 22, which handles serve for manipulation of the holders.

The top plate includes a plain plate member 23, the width thereof from edge to edge being only slightly less than the internal distance between the flanges 16 and 17 of the bottom plate so that when seated in surface contact with the bottom plate the edges thereof will abut against the flanges for the purpose of guiding the movement of the top plate. Intermediate its ends the top plate has upstanding ears 24 and 25 along its opposed edges provided with inwardly disposed pins 26 and 27. The top plate has a plurality of openings 28 adapted to register with the openings 14 of the bottom plate in one position of the former, and adapted to be brought partially out of registration by longitudinal movement of the top plate in order to grip the sticks. The openings 28 are provided with V-shaped notches 29, the metal being removed on the lower side of the plate as shown at 31 to provide a sharp edge 32 at the point of the notch so as to be capable of cutting into the wood of the sticks a short distance where necessary, and in this manner to compensate for slight differences in the width and the thicknesses of the sticks occasioned by swelling of the sticks. The openings 28 are sufficiently large to pass stick aligning blocks, designated generally by the numeral 33 and shown more in detail in Fig. 12. These blocks are in the form of short cylindrical rods having a longitudinally disposed V-shaped slot 34 facing the openings 14, the blocks being welded or otherwise attached to the lower plate as shown at 35. These blocks are of such height that the V-shaped slots 34 serve as abutments for the edge of the stick opposite the V-shaped notches 29 of the top plate so that the sticks are held as shown in Fig. 2 by their edges between the V-shaped notches 29 and the V-shaped slots 34. The arcuate sides 36 of the blocks are complemental to arcuate edges 37 of the openings 38 so as to serve as abutments to limit the movement of the top plate 23 at the disengaged position shown in Figure 1. From Fig. 12 it will be seen that when the top plate is moved to the disengaged position the edges 38 of the openings 14 extend across the point of the V-shaped notches 29 so that when the top plate is moved to the disengaged position, the sticks, should they wedge into the notch 29, are forced out of this notch so as to drop freely through the openings 29 and 14.

The top plate 23 is moved between its positions by a handle 39 attached to levers 41 and 42, which levers have openings 43 and 44 adapted to receive pins 45 seated in the flanges 16 and 17, the handle 29 being of such length as to support the levers 41 and 42 in contact with the inner surfaces of these flanges so as to retain the levers on the pins 45. The levers 41 and 42 have sufficient resiliency as to be capable of being pressed together so that the pins 45 will clear the openings 43 and 44 and thereby permit removal of the lever from the bottom plate. Links 46 and 47 are pivoted to the levers 41 and 42 by means of headed pins 48 and 49, the opposite ends of the links having openings 51 and 52 receivable on the pins 26 and 27, respectively, of the top plate 23, and having sufficient outward pressure to retain them on the pins. The links and levers have sufficient resiliency so that they can be sprung together for removal of the pins 26 and 27 from the openings 51 and 52 to thereby assemble and disassemble the lever from the holder. It will be seen that when the handle 39 is moved from the position shown in Fig. 1, in which the holes correspond to the position shown in Fig. 12, to the position of Fig. 2, the top plate will be moved toward the right facing Figs. 1 and 2 to thereby bring the openings in the top plate slightly out of registration with the openings of the bottom plate to grip the sticks. Likewise, movement of the handle in the opposite direction imparts correspondingly opposite movement of the top plate to release the sticks.

In order to retain the top plate 23 in seated engagement against the bottom plate and yet permit its easy removal for cleaning, the flanges 16 and 17 are provided with inwardly directed pins 54, 55 and 56 which overhang the top plate and are spaced from the bottom plate a distance slightly greater than the thickness of the top plate. The top plate is provided with corresponding openings 57, 58 and 59, so positioned that when the operating lever and links are removed from the holder, the top plate can be moved to a position in which these openings register with the pins and the top plate can thus be lifted away from the bottom plate, the pins passing through the openings, as will be apparent from Fig. 5. The top plate also has a pair of openings along its opposed edges as shown at 61 for the passage of the pins 45 which support the actuating lever.

Attention is directed to the novel and improved features of my construction. It will be seen that the top plate seats directly and in face contact with the bottom plate 13 and is guided by the flanges 16 and 17. Through this arrangement the necessity for extra pieces and parts is eliminated, thereby rendering the device easily cleaned. It will also be noted that the top plate is held in position by the small round pins 54 to 56, which in turn are easily cleaned. Furthermore, the top plate can be quickly slipped out of the bottom plate by compressing the levers 41 and 42 and the links 46 and 47, and thereafter lifting the top plate free. When so dismantled, the top plate presents merely a smooth practically flat plate which can be thoroughly cleaned by the usual methods. Likewise, the bottom plate presents surface characteristics which may be easily cleaned. Attention is also directed to the fact that through the use of the abutment members 33, the usual intricately formed guiding and supporting members heretofore used are eliminated. These abutment members present smooth easily cleaned surfaces, greatly eliminating the edges and corners in which gummy material such as candy, ice cream mix and the like, may lodge and resist removal during the cleaning operations. Attention is also directed to the fact that the arrangement of holes is such that the device is self-discharging, that is, so that the sticks are positively released from the V-shaped edges 29 at the end of the opening movement. Attention is also directed to the fact that the handle at no point spans the area occupied by the sticks so that there is no tendency for the handles to interfere with the stick feeding operations. Furthermore, movement of the top plate is occasioned by a more or less vertical movement of the handle 39 directed beneath the main handle 21 so that the lever handle can be conveniently manipulated by the fingers while the operator holds the stick holder.

It will be understood that a specific embodiment of the invention has been shown and described by way of illustrating the preferred manner of practicing the invention, but I do not wish to be limited except as required by the scope of the appended claims, in which I claim:

1. The combination in a stick holder of a plate having upturned side edges and a plurality of openings of a size to receive a confection stick, a second plate seated in face to face contact with said first plate with its edges in guiding abutment with said upturned side edges for sliding movement, said second plate having a plurality of openings registering with the openings of the first plate, lever means for sliding said second plate on the first plate to move the openings thereof out of registration with the openings of the first plate to grip sticks therebetween.

2. The combination recited in claim 1 wherein said first mentioned plate has a guiding abutment projecting through each of said openings in said second plate, said abutment having a V-shaped aligning and gripping surface facing the opening in said first mentioned plate.

3. The combination recited in claim 1 wherein the openings of said first mentioned and second mentioned plates are of such relative size and shape that when the second mentioned plate moves to its open position, the leading edge of each opening thereof passes over the edge of the opening in the first mentioned plate, whereby the latter acts to release a stick gripped by the second mentioned plate.

4. The combination recited in claim 1 wherein the first mentioned plate has a plurality of pins positioned on said upturned side edges and projecting inwardly over the second mentioned plate to retain the second mentioned plate in face to face contact with the first, and wherein said second mentioned plate has a plurality of notches in the edge thereof positioned in one position of said plates to register with said pins for removal of the second mentioned plate from the first.

5. The combination recited in claim 1 wherein said lever means comprises links positioned for rotation on said upturned side edges and links connecting said levers to said second mentioned plate.

6. The combination recited in claim 1 wherein said lever means comprises a lever rotatably supported on the inner surface of each of said upturned side edges, headless pins on said side edges for pivotally supporting said levers, means for spacing said levers to cause the same to be retained on said pin, a link pivotally supported on each of said levers, and headless pins on said second mentioned plate adapted to seat in an opening of said links, whereby said levers and links are removable from said upturned side edges by compressing the lever means to remove said pins from said levers and said links.

RALPH F. ANDERSON.